Patented Sept. 23, 1941

2,256,790

UNITED STATES PATENT OFFICE 2,256,790

PRODUCTION OF ALUM AND ALUMINUM SALTS

Robert Edgar Pennell, Anderson, S. C.

No Drawing. Application November 14, 1938,
Serial No. 240,340

3 Claims. (Cl. 23—118)

This invention has as its object the production of alum and aluminum salts of high purity, deriving the alumina from clay and utilizing such materials as potassium chloride or sodium chloride in producing these compounds. Kaolin or clay of 40% alumina with a very low iron content is plentiful. Commercial potassium chloride of over 99% purity and free of iron may be had from American potash producers. Sodium chloride of high purity is also available.

In this process, potassium chloride or sodium chloride is treated with sufficient sulphuric acid to form the bi-sulphate plus sufficient excess to form an alum when brought to react with calcined clay in a quantity necessary to supply the required amount of available or reactive aluminum oxide for forming the alum. The hydrochloric acid liberated in forming the bi-sulphate is used directly in producing aluminum chloride from calcined clay, or in producing other chlorides.

Steam is used in reacting upon the KCl or NaCl with sulphuric acid supplying the necessary heat and in driving off the HCl liberated, also supplying the necessary agitation. By starting with sulphuric acid of 60° to 66° Bé. the heat of dilution aids in supplying heat for the reaction. Steam of moderate pressure is preferable although super-heated steam may be used. In starting the reaction, twice the amount of sulphuric acid necessary to form the bi-sulphate is put in a closed reaction chamber or digester and the proper amount of potassium or sodium chloride is slowly added. Steam of ordinary pressure is then admitted at the bottom of the digester. The steam and the heat of dilution of the acid soon brings the mixture to the boil. Care must be taken to prevent too rapid evolution of the HCl set free. The HCl-steam mixture is forced from the bi-sulphate digester into the bottom of a second closed digester in which has been placed sufficient calcined clay and water for reacting with the HCl produced. The hot HCl admitted begins to act upon the clay immediately, and the boiling point is gradually reached. Any HCl passing from this digester may be exhausted into a second aluminum chloride digester similarly charged, or may be absorbed in water for future use. Action of HCl on calcined clay takes place rapidly when near or at the boiling point. Concentrations of free HCl should not be much in excess of 20.4%, the constant boiling point, else too much HCl is liberated. By holding the concentration at or slightly below this point the loss of HCl is small.

Due to the large excess sulphuric acid used in forming the bi-sulphate the introduction of steam removes substantially all HCl in about 45 minutes, the temperature reaching from 110–115° C. Underneath the digester containing the bi-sulphate-acid mixture is a vessel in which is placed an excess of finely divided calcined clay. The available $Al_2O_3$ in the clay is slightly more than is required for reacting with the bi-sulphate-acid mixture so as to insure the production of a neutral alum. After removal of all HCl, the hot bi-sulphate-acid mixture is drawn into the vessel containing the clay, and steam admitted keeping the entire mixture at the boil until complete reaction has taken place which requires about one and one-half hours. The hot concentrated alum solution is immediately filtered from the silica and excess clay. The alum is then crystallized from the filtered solution, and is centrifuged or filtered from the impurities in the small amount of mother liquor remaining. The steam may be so regulated as to have a solution of the proper strength on filtering and to have a small excess of mother liquor remaining after crystallization. If the solution is too weak it should be concentrated before crystallization, if too strong it may be diluted.

The aluminum chloride solution produced from the HCl and clay in the second digester is filtered from its silica residue and utilized as such, or crystallized to hydrated aluminum chloride.

No agitators are needed as steam of suitable pressure is sufficient to keep the contents agitated. No auxiliary heat should be required except for evaporations, or in crystallizations of the aluminum chloride.

Equipment used should be of acid proof material, and well insulated against heat losses.

The reactions taking place are as follows:
Potash alum—

1. $2KCl + 4H_2SO_4 = 2KHSO_4 + 2H_2SO_4 + 2HCl$
2. $2KHSO_4 + 2H_2SO_4 + Al_2O_3 + 21H_2O =$
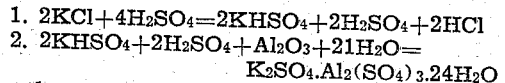

Soda alum—

3. $2NaCl + 4H_2SO_4 =$
$2NaHSO_4 + 2H_2SO_4 + 2HCl$
4. $2NaHSO_4 + 2H_2SO_4 + Al_2O_3 + 21H_2O =$
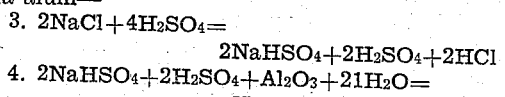

Other tri-valent metals in a reactive form as the metal itself, its oxide, or the hydrate may be substituted for the above $Al_2O_3$ to form other alums.

As shown under Equations 2 and 4 above, the acid sulphate of the mono-valent element may be produced to which is subsequently added an equal amount of $SO_3$ in the form of sulphuric acid to form an alum when treated with proper amount of $Al_2O_3$ in the form of calcined clay. This would not be as economical procedure since heat value would be lost as compared to the formation of acid sulphate when using twice the amount of sulphuric acid in its making, also it is much more difficult to make chlorine free acid sulphate when using just sufficient sulphuric acid for its production.

*Example*

In a specific case, 329 parts of a 61.3 degree Beaumé sulphuric acid, equal to 263 parts actual acid, was placed in a closed digester to which 100 parts of KCl was gradually added. When the evolution of the HCl gas had subsided, steam at 50 pound pressure was admitted at the bottom of the digester. The HCl liberated was forced into the bottom of a second closed digester in which had been previously placed 65 parts of calcined clay carrying 46% $Al_2O_3$ to which had been added 190 parts of water. After steam together with the heat of dilution of the sulphuric acid had brought the contents of the bi-sulphate digester to the boil at 112° C., the admission of steam was adjusted to keep a steady flow of the HCl-steam mixture into the aluminum chloride digester which soon reached the boiling point aided by heat of absorption of the HCl and heat of reaction with the clay. Any HCl volatilized from this digester was absorbed in water. A safety chamber was placed in the HCl-steam line between the two digesters to prevent syphoning back on a pressure drop.

After keeping the bi-sulphate digester boiling for one hour, all HCl had been eliminated, and had been forced into the aluminum chloride digester. The hot potassium bi-sulphate-acid mixture was then drawn into a digesting tank in which had been placed 160 parts of calcined clay. Steam of 50 pound pressure was introduced at the bottom of this tank and the contents kept at the boil for one hour and thirty minutes when complete reaction had occurred. The hot alum solution was immediately filtered free of silica and excess clay. The alum was then crystallized and filtered from the small amount of mother liquor remaining. The alum solution is very concentrated, being mostly molten alum with sufficient dilution for removing impurities such as iron. The crystallized potash alum produced is of high purity.

The aluminum chloride solution was filtered from the residue and crystallized as a basic hydrated salt which is all water soluble.

In another case, 78.53 parts of NaCl was substituted for the 100 parts of KCl and treated in the similar manner throughout producing soda alum.

Instead of removing the bi-sulphate acid mixture from the digester after freeing of HCl, the clay may be added direct to the digester and the digestion with the bi-sulphate acid mixture continued until complete reaction has occurred. The alum solution is then drawn direct from the digester for filtration. In adding the clay direct to the digester for treatment, it is best to make sure practically all HCl has been removed, else some aluminum-chloride may be formed since the action on the clay by the acid-bi-sulphate mixture is rapid. Putting the clay in with the potassium or sodium chloride at the start results in considerable aluminum chloride going into the final product. Frequent tests of the progress of the reaction should be made so that the contents may be drawn from the digester for filtration as soon as the reaction is complete. Continued boiling after reaction is complete tends to make a slightly basic product when an excess of clay is used over that required. The use of a large excess of clay should be avoided. A well calcined clay should have approximately 95% of its total $Al_2O_3$ reactive in this process.

I do not limit myself as to temperatures and pressures given. Other temperatures and pressures were used with good results.

Uncalcined clay was used in place of calcined clay, but the time required for treatment was considerably lengthened, and the present reactive $Al_2O_3$ was much less in the uncalcined than in the calcined clay.

Aluminum oxide or hydrate may be substituted for clay in making the alums.

I claim:

1. A process for producing potash alum which comprises reacting potassium chloride with substantially twice the quantity of sulphuric acid necessary to produce the bisulphate, heating the reaction mixture by the injection of steam, thus producing a reaction mixture consisting of potassium bisulphate and free sulphuric acid and gaseous hydrochloric acid, reacting the mixture of sulphuric acid and bisulphate with sufficient aluminous material to form the alum, the sulphuric acid being maintained in such concentration during the first reaction that substantially all the hydrochloric acid formed is removed before the reaction of the mixture with the aluminous material.

2. A process for producing an alum which comprises reacting an alkali metal chloride with substantially twice the quantity of sulphuric acid necessary to produce the bisulphate, heating the reaction mixture by the injection of steam, thus producing a reaction mixture consisting of alkali metal bisulphate and free sulphuric acid and gaseous HCl and steam, reacting the mixture of sulphuric acid and bisulphate with sufficient aluminous material to form an alum, the acid being maintained in such concentration during the first reaction that substantially all the HCl formed is removed, the hydrochloric acid and steam thus produced being progressively introduced into a slurry in which an aluminous material is suspended, the progressive introduction of the gaseous vapors resulting in the progressive building up of the ratio of hydrochloric acid to the alumina content of the material to the proportion of reacting with substantially all of the available alumina, the progressive admission of hydrochloric acid gas into the reacting mixture resulting in the progressive decomposition of the aluminous material to form aluminum chloride and insoluble residue, the aluminum chloride solution thus produced being then separated from the insoluble residue.

3. A process for producing an alkali alum which comprises reacting an alkali chloride with substantially twice the quantity of sulphuric acid necessary to produce the bisulphate, heating the reaction mixture by the injection of steam, thus producing a reaction mixture consisting of an alkali bisulphate and free sulphuric acid and gaseous hydrochloric acid, reacting the mixture of sulphuric acid and bisulphate with sufficient aluminous material to form the alum, the sulphuric acid being maintained in such concentration during the first reaction that substantially all the hydrochloric acid formed is removed before the reaction of the mixture with the aluminous material.

ROBERT E. PENNELL.